US011247108B2

(12) United States Patent
Vollbrecht et al.

(10) Patent No.: US 11,247,108 B2
(45) Date of Patent: Feb. 15, 2022

(54) SYSTEM AND METHOD FOR INTEGRATING PHYSICAL, MOVING TARGETS INTO A GAME, SPORT OR OTHER ACTIVITY

(71) Applicant: FLYINGTEE TECH, LLC, Jenks, OK (US)

(72) Inventors: James Vollbrecht, Jenks, OK (US); Jeremy Mathew Carver, Millcreek, UT (US); John Vollbrecht, Jenks, OK (US)

(73) Assignee: FLYINGTEE TECH, LLC, Tulsa, OK (US)

( * ) Notice: Subject to any disclaimer, the term of this patent is extended or adjusted under 35 U.S.C. 154(b) by 97 days.

(21) Appl. No.: 16/372,146

(22) Filed: Apr. 1, 2019

(65) Prior Publication Data

US 2019/0299073 A1    Oct. 3, 2019

Related U.S. Application Data

(60) Provisional application No. 62/650,742, filed on Mar. 30, 2018.

(51) Int. Cl.
*A63B 67/02* (2006.01)
*A63B 71/06* (2006.01)
(Continued)

(52) U.S. Cl.
CPC .......... *A63B 67/02* (2013.01); *A63B 24/0021* (2013.01); *A63B 63/06* (2013.01);
(Continued)

(58) Field of Classification Search
CPC ...... A63B 24/0021; A63B 67/02; A63B 63/06
(Continued)

(56) References Cited

U.S. PATENT DOCUMENTS 6,322,455 B1 * 11/2001 Howey .............. A63B 24/0003
                                                    273/461
7,984,910 B1 *  7/2011 Nielsen .................. A63B 67/06
                                                    273/359
(Continued)

FOREIGN PATENT DOCUMENTS

WO    WO-2007037705 A1 *  4/2007 ......... A63B 71/0605

OTHER PUBLICATIONS

PCT/US2019/025215 International Search Report and Written Opinion, dated Jul. 16, 2019, Flyingtee Tech, LLC.
(Continued)

*Primary Examiner* — John E Simms, Jr.
*Assistant Examiner* — Rayshun K Peng
(74) *Attorney, Agent, or Firm* — Crowe & Dunlevy, P.C.

(57) ABSTRACT

The invention generally relates to a system and method for integrating physical, moving targets into a game, sport or other activity, including the specific method of how to track the moving target and the interaction of one or more users as the target moves. The system and method for integrating physical, moving targets into a game, sport or other activity enables a plurality of users to simultaneously attempt to hit a moving target in the field of play with a moving object while tracking the moving target and moving object using a combination of sensors located on or around the field of play and on or around the moving target and/or moving object.

32 Claims, 7 Drawing Sheets

(51) Int. Cl.
*A63B 63/06* (2006.01)
*A63B 24/00* (2006.01)
*A63B 102/32* (2015.01)

(52) U.S. Cl.
CPC .. *A63B 71/0622* (2013.01); *A63B 2024/0025* (2013.01); *A63B 2024/0034* (2013.01); *A63B 2024/0037* (2013.01); *A63B 2102/32* (2015.10); *A63B 2209/00* (2013.01); *A63B 2220/805* (2013.01); *A63B 2220/89* (2013.01)

(58) Field of Classification Search
USPC .......................................................... 473/512
See application file for complete search history.

(56) References Cited

U.S. PATENT DOCUMENTS

| | | | | |
|---|---|---|---|---|
| 2013/0274025 | A1* | 10/2013 | Luciano, Jr. | H04B 5/0031 |
| | | | | 473/156 |
| 2015/0343291 | A1* | 12/2015 | Leech | A63B 69/36 |
| | | | | 473/199 |
| 2018/0011184 | A1* | 1/2018 | Du Toit | G01S 13/88 |

OTHER PUBLICATIONS

Extended European Search Report dated Nov. 26, 2021 in corresponding European Patent Application No. 19774339.6.
Rowstron A. et al., "The Cambridge University Robot Football Team Description", Intelligent Robotics and Applications, Jan. 1, 1999.

* cited by examiner

SYSTEM AND METHOD FOR INTEGRATING PHYSICAL, MOVING TARGETS INTO A GAME, SPORT OR OTHER ACTIVITY

CROSS REFERENCE TO RELATED APPLICATIONS

The application claims the benefit of and priority to U.S. Provisional Patent Application No. 62/650,742, filed Mar. 30, 2018, and incorporates by reference said provisional application in its entirety.

BACKGROUND OF THE INVENTION

1. Field of the Invention

This invention generally relates to a system and method for integrating physical, moving targets into a game, sport or other activity, including the specific method of how to track the target(s) and the interaction of one or more users with the target(s) as it moves.

2. Description of the Related Art

A number of activities, including most sports, have evolved to feature the interaction of the user (or player) and a non-static target. For example, in skeet shooting, a target is launched into the air and the user attempts to destroy the target using a gun. While this is interesting and enjoyable, it effectively limits the field of simultaneous users to one.

A popular game in golf, especially on golf practice ranges, involves multiple users trying to hit the golf cart, which is driven by a person to sweep the range of golf balls, and typically involves a small set of users who are playing against each other. The more users added to the competition, the more difficult it becomes to distinguish which user hit the target with their ball.

A modern, computerized driving range typically involves twenty (20) to one-hundred and two (102) stations, on a single or multiple levels, for users, enabling twenty (20) to one-hundred and two (102) users to hit the ball simultaneously into a physical range while a computer uses various methods of detection to determine the flight path of the ball, the landing point of the ball, and the final resting place of the ball to automatically and accurately score the game for each of the users.

It is therefore desirable to provide a system and method for integrating physical, moving targets into a game, sport or other activity.

It is further desirable to provide a system and method for integrating physical, moving targets into a game, sport or other activity that enables a plurality of users to simultaneously attempt to hit a moving target in the field of play using a combination of sensors located on or around the field of play and on or around the object.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, the invention relates to a system and method for integrating physical, moving targets into a game, sport or other activity, including the specific method of how to track the target and the interaction of one or more user the target as it moves.

In general, in a first aspect, the invention relates to a system for integrating physical, moving targets into a game, sport or other activity. The system includes a field of play extending from a plurality of bays, with one or more moving objects launched from one or more of the bays and one or more moving targets configured to traverse the field of play. The system also includes a tracking system having at least one tracking computer in communication with at least one target sensor. Each of the target sensors is configured to detect movement and/or position of each of the moving targets and each of the moving objects on the field of play.

In general, in a second aspect, the invention relates to a method for integrating physical, moving targets into a game, sport or other activity using the system of the first aspect above.

In general, in a third aspect, the invention relates to a computer-implemented method for integrating physical, moving targets into a game, sport or other activity. The method includes the steps of: electronically detecting with one or more target sensors coordinate positions of one or more moving targets traversing a field of play; electronically detecting with one or more target sensors coordinate positions of one or more moving objects launched from one or more bays and traversing the field of play; electronically communicating the coordinate positions of the moving targets and the coordinate positions of the moving objects to a tracking computer; and displaying the coordinate positions of the moving targets and the coordinate positions of the moving objects on at least one monitor that is in electronic communication with the tracking computer.

In accordance with the above aspects of the invention, the movement of the moving targets can be controlled with a movement computer, the tracking computer or both. The target sensors can be optical sensors, radar sensors, LIDAR sensors, or a combination thereof, and the moving targets can include a highly reflective fiducial. The moving targets can be flying drones, cabled objects or a combination thereof, and the moving objects can be one or more golf balls.

In addition, the inventive system and method can include at least one stationary target positioned on the field of play, and the tracking computer can be configured to store a position of the stationary target on the field of play.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
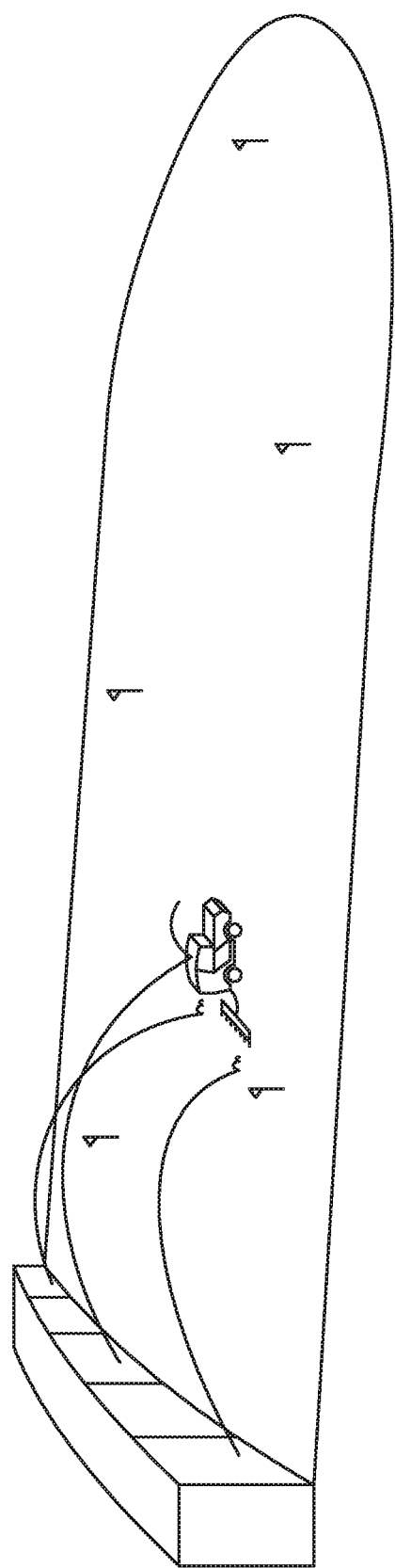
FIG. 1 illustrates a perspective view showing an example of a physical field of play showing multiple users attempting to hit a golf ball collection cart that is in motion.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

The invention generally relates to a system and method for integrating physical, moving targets into a game, sport or other activity, including the specific method of how to track the target and the interaction of one or more user the target as it moves. The system and method for integrating physical, moving targets into a game, sport or other activity enables a plurality of users to simultaneously attempt to hit a moving target in the field of play using a combination of sensors located on or around the field of play and on or around the object.

During game play, at least one player will attempt to hit a moving target with a moving object, namely each player will throw or use a golf club to hit a golf ball attempting to make it collide with a moving golf ball collection cart in a driving range field. While illustrated and exemplified in connection with golf, it will be understood that the system and process can be adapted to a variety of rules, games, formats, sports, activities, etc. For example, in some embodiments, the moving targets may be flying drones and/or the inventive system may incorporate moving targets and stationary targets or only stationary targets. The coordinate positions (X, Y, Z) of the moving object or golf ball will be detected by one or more sensors and reported to a tracking computer with a time stamp for each detected golf ball. The moving target itself may contain one or more devices for reporting its location to the system that monitors the location of the golf balls as they fly in the same space. The sensor can be any suitable sensor to detect the movement of an object through three-dimensional space, such as GPS, LIDAR, radar, optical or other sensors positioned on the range building, around the range, and/or on the moving target. The detection of the coordinate positions of the moving target or golf ball may be aided using special materials on the moving target or golf ball, such as highly reflective fiducials positioned at key points on the moving target. The tracking computer will then use the reported coordinate positions to determine a flight path of the ball from the point of impact within a bay into the physical range field, to the ball's impact on the ground, to the ball's final resting place on the range field, with corresponding time stamps for each reported X, Y, and Z coordinate position.

Figure 2:
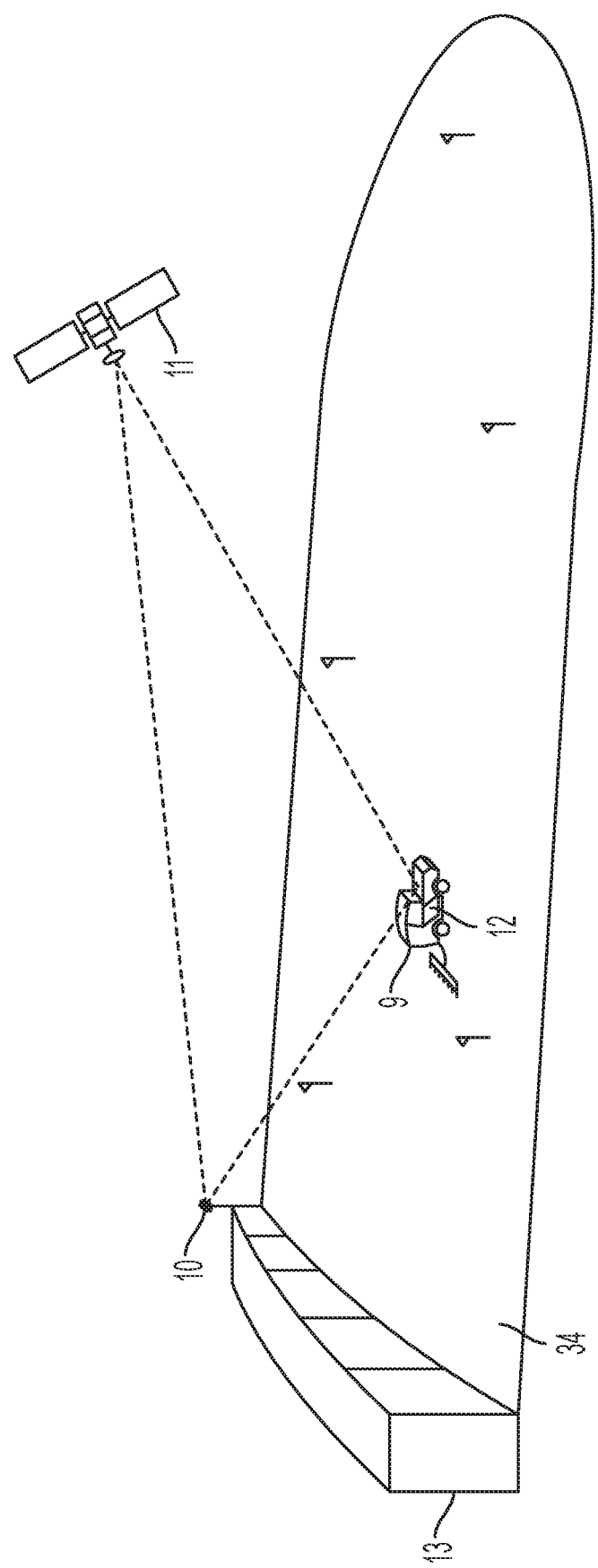
FIG. 2 is a perspective view showing an example of GPS sensors located on a golf cart and corresponding readers located in various locations around the range used to track the position of the golf cart in accordance with an illustrative embodiment of the system and process disclosed herein.
Figure 3:
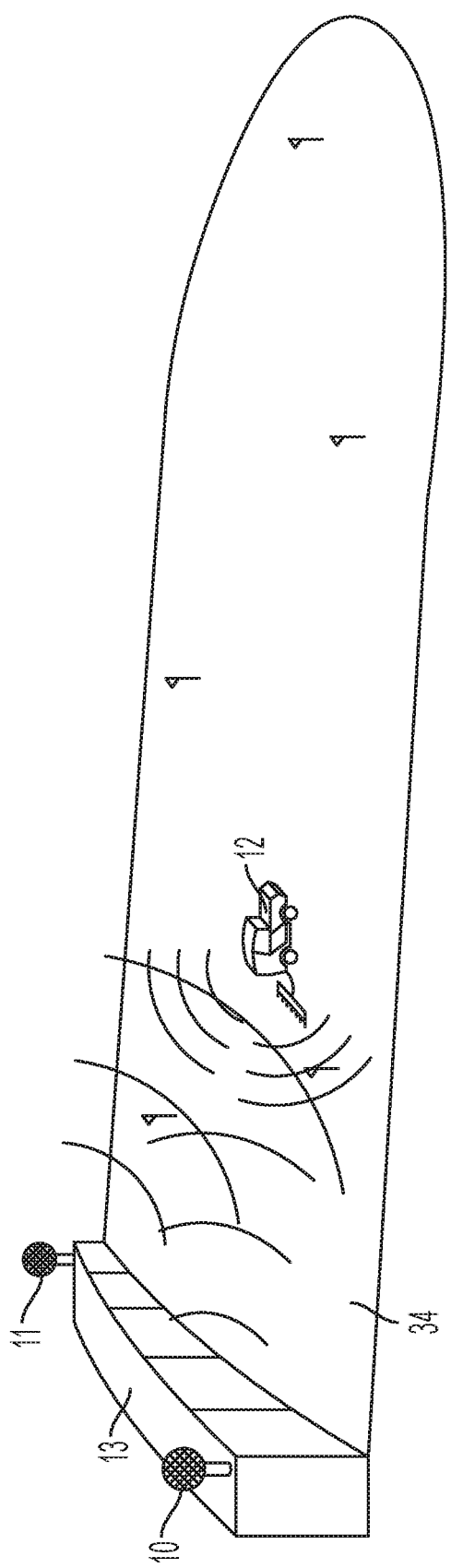
FIG. 3 is a perspective view showing an example of LIDAR, radar, optical or other sensors located on the range building and/or around the range, and optionally depending upon the type of sensor, reflectors located on the cart used to track the position of the golf cart in accordance with an illustrative embodiment of the system and process disclosed herein.
Figure 4:
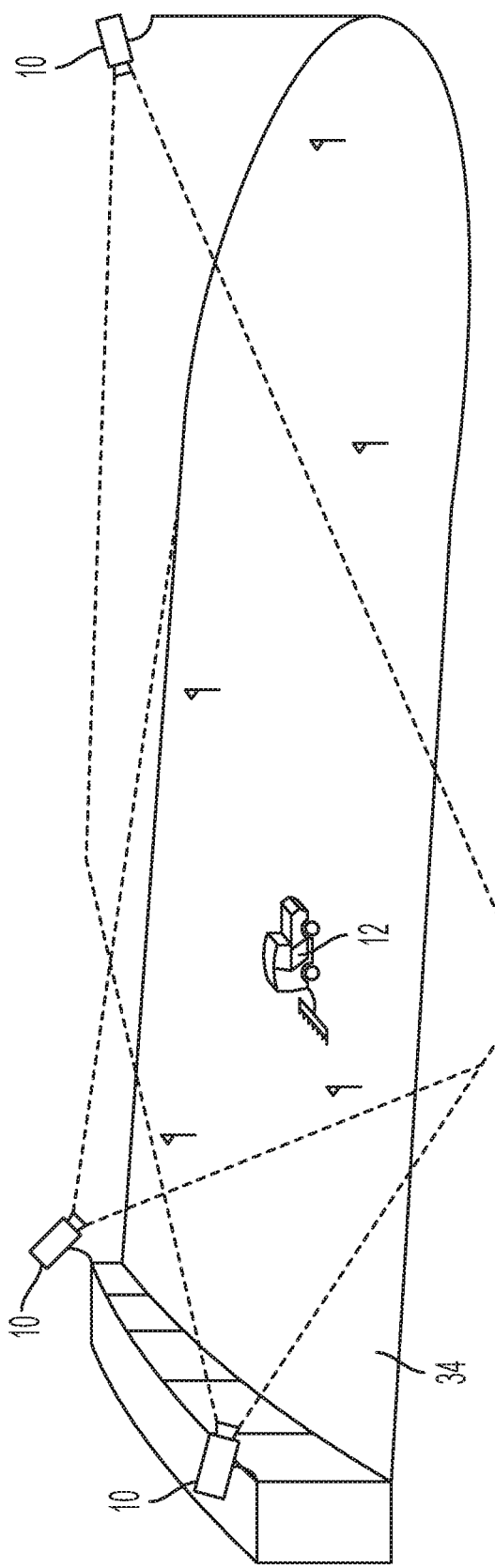
FIG. 4 is a perspective view showing another example of LIDAR, radar, optical or other sensors located on the range building and/or around the range, and optionally depending upon the type of sensor, reflectors located on the cart used to track the position of the golf cart in accordance with an illustrative embodiment of the system and process disclosed herein.

The moving target or golf cart will move about the field of play and will occupy a three-dimensional volume on the range field, represented by similar coordinate positions (X, Y, Z). The edges of the coordinate positions at a given time will be observed by one or more sensors as exemplified in FIGS. 2-4 and 6-7, and the coordinate positions will be electronically communicated from each of the sensors to the tracking computer, or reported directly by the target object. The coordinate position of moving targets on the field of play 34 can be detected using one or more sensors 10 and a tracking system 11. By way of example, FIG. 2 shows a moving target or golf cart 12 on a field of play 34 extending from a multi-level, multi-bay golf range facility 13 where a GPS tracking system is used to detect the coordinate positions of the golf cart 12 on the field of play 34. FIG. 2 shows the use of a GPS sensor 10 on the facility 13 and a GPS reader 9 positioned on the golf cart 12 that is moving about the field of play 34. FIG. 3 shows a golf cart 12 moving about the field of play 34 where a radar or LIDAR sensor 10 and an associated tracking antenna or system 11 is used to detect the coordinate positions of the golf cart 12 on the field of play 34. FIG. 4 shows a golf cart 12 on a field of play 34 where at least one optical sensor 10 is used to detect the coordinate positions of the golf cart 12 on the field of play 34. For each embodiment exemplified in FIGS. 2-4, each of the sensors 10 and/or the tracking system 11 is in communication with the tracking computer. It is further understood that the golf cart 12 can be replaced by another form of a moving target, such as an aerial vehicle like a remotely controlled drone, helicopter, airplane, etc., in keeping with the scope of the inventive system and method disclosed herein.

Figure 5:
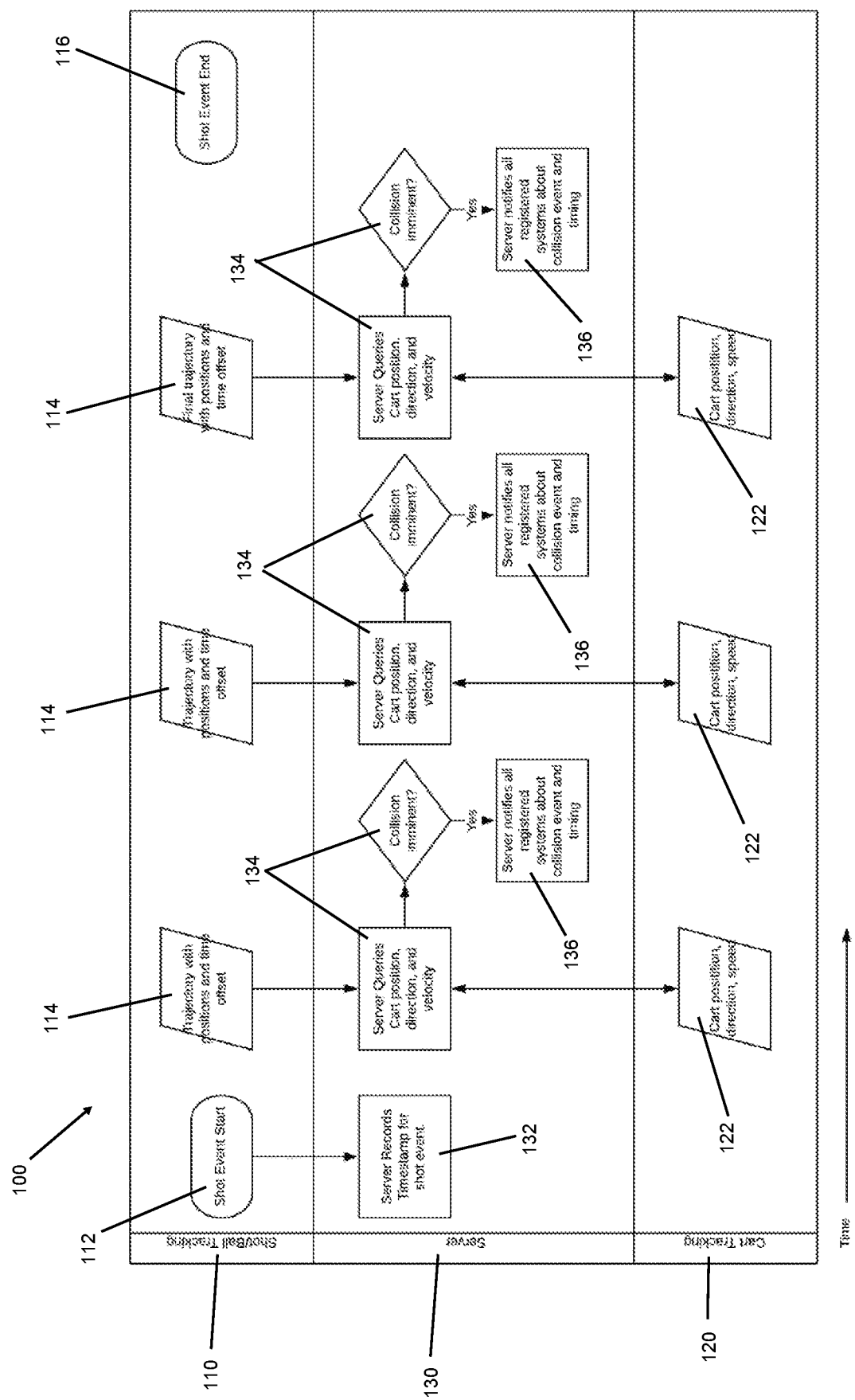
FIG. 5 illustrates a process flow diagram for synchronizing the coordinate positions of the ball and the moving target in time in accordance with an illustrative embodiment of the system and process disclosed herein.

As illustrated in FIG. 5, if the moving object or golf ball and the moving target or golf cart occupy the same X, Y, Z coordinate positions, the inventive system and process will determine that the user was successful in hitting the moving golf cart. The inventive system determines a successful hit of the golf ball on the golf cart by the tracking computer determining the coordinate positions of the golf ball and the golf cart. FIG. 5 shows a tracking timeline 100, with time proceeding forward as the timeline moves from left to right.

The timeline 100 begins at the shot event start 112, wherein the golf ball enters the field of play and the tracking computer or server records the time 132 and sensors begin to track the coordinate position of the golf ball. The top row 110 shows inventive system tracking not only position of the golf ball but also the trajectory of the golf ball and the time. These ball values 114 are continually tracked. The bottom row 120 shows the inventive system tracking the golf cart position, direction and speed. These cart values 122 are also continually tracked. In other embodiments of the inventive system, the position of the golf cart could be determined by a movement computer and sent to the server. The movement computer could provide a movement loop, adaptive movement, human controlled movement or any other suitable means of movement. In other embodiments of the inventive system, the golf cart could be a stationary target and the constant coordinate position could be stored in the server. The middle row 130 of the timeline 100 shows the server determining whether the golf ball and the golf cart have collided by querying the tracking systems of the golf cart and golf ball. The query step 134 determines if a collision is imminent between the golf ball and the golf cart. If a collision is imminent, then the server will send a notification 136, which will notify all registered systems within the inventive system. A registered system could include monitors and computers in the bays and in a control area. One such notification of the collision to a registered system could be to the monitor in the bay where the golf ball was launched. The notification may award points or other rewards to a user in the bay for the collision. The computers and monitors may also be used for user interaction with the game system. If a collision is not imminent, the server repeats the query step 134. The server will continue to query the coordinate position of the golf ball and golf cart until a collision is imminent or a shot event end 116 wherein the golf ball movement stops within the field of play.

Figure 6:
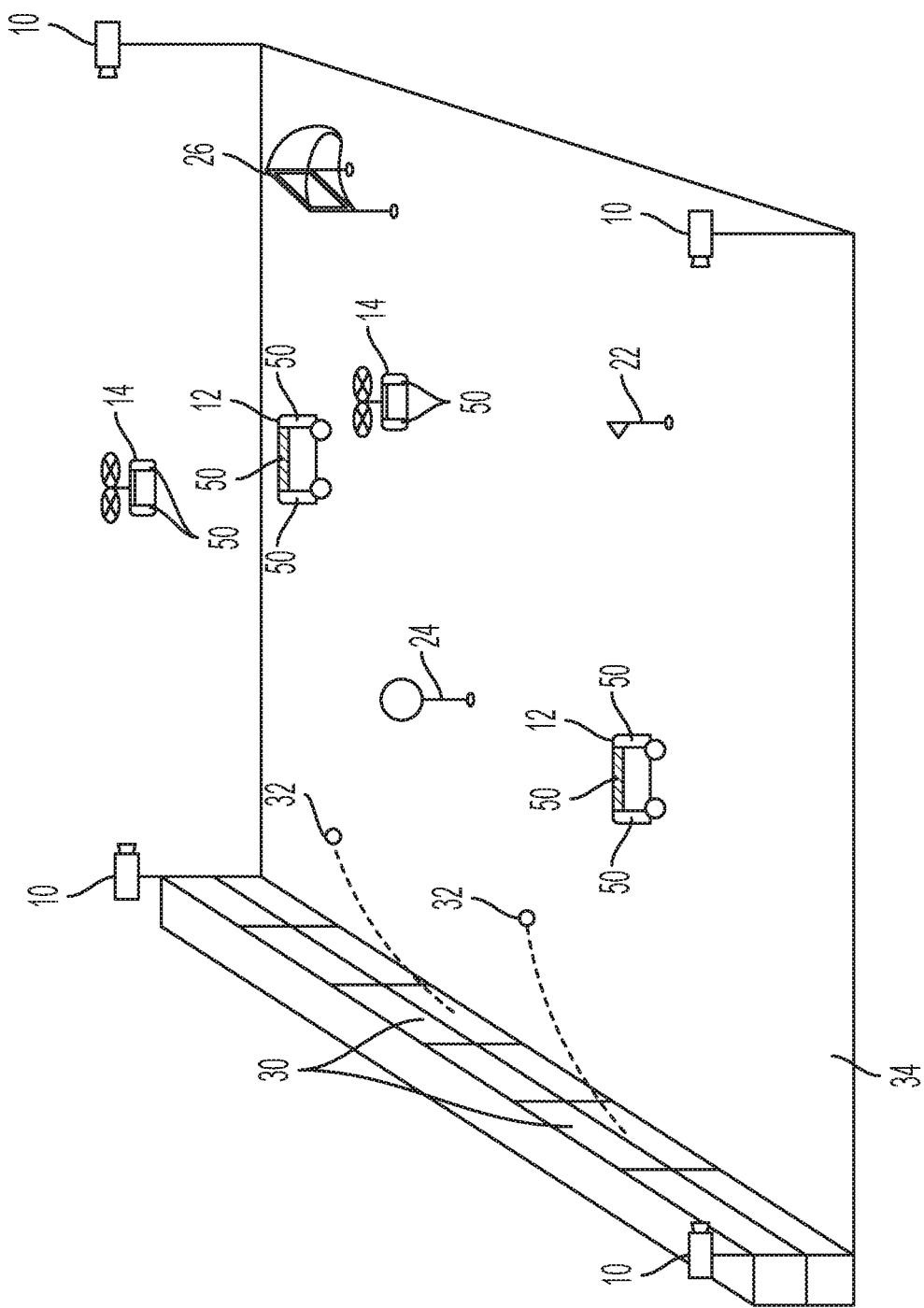
FIG. 6 is a perspective view showing an example of a field of play with at least one moving target equipped with reflectors used to track the position of the moving target, at least one stationary target, and a plurality of optical sensors located on the range building and/or around the range in accordance with an illustrative embodiment of the system and process disclosed herein.

Turning now to FIG. 6, the inventive system and method includes sensors 10, which detect the coordinate positions (X, Y, Z) of the moving targets 12 and moving objects or golf balls 32 in the field of play 34 and report the coordinate positions to a tracking computer (not shown) with a time stamp for each detected golf ball 32 and moving target 12. FIG. 6 also shows a set of bays 30 in the facility 13 from which users may hit golf balls 32 into the field of play 34. The moving targets 12 in FIG. 6 include golf carts 12A and flying drones 12B. The moving targets 12 can include highly reflective fiducials 50 at selected points on the moving targets 12. The highly reflective fiducials 50 aid the sensor 10 in detecting the coordinate position of the moving targets 12. Other moving targets may also be equipped with highly reflective fiducials 50. The movement of the moving targets 12 may by controlled by a human pilot or by a computer which can set varying or predetermined paths for the moving targets 12 to follow about the field of play 34. The movement paths and movement speeds of the moving targets 12 may be changed to account for varying user skill. As exemplified in FIG. 6, the inventive system and method may also include one or more stationary targets 20, such as a target pin 22, a balloon 24, and/or a net 26. The coordinate positions of the stationary targets 20 will remain constant while users are playing the game to allow users of different skill levels to enjoy the game. The stationary targets 20 in FIG. 6 vary in form from the moving targets 12, but it should be understood that the moving targets 12 can become stationary targets 20 as well by stopping their movement about the field of play 34. This will allow the game to be adapted to users of differing skill levels. The constant position of the stationary targets 20 can be electronically stored in the tracking computer so that if a golf ball 32 hit by a user occupies the same coordinates, the inventive system and process will determine that the user was successful in hitting the stationary target 20. The coordinate position of the stationary targets 20 may be changed between games and the new coordinate positions of the stationary targets 20 can be stored in the tracking computer. The stationary targets 20 can also include any other object whose coordinate position can be stored in the tracking computer.

Bays in the golf range facility may be equipped with one or monitors. The tracked coordinate positions of the moving targets, stationary targets, and moving objects may be continually displayed to users on monitors which are installed in the bays. The monitors can be used to send notifications to the users. For example, when the inventive system detects a collision between a moving object and moving target or stationary target a notification could be sent to the monitor in the bay where the moving object was launched. The notification could be a point reward for the collision. Notifications may also be sent to other registered systems such as a control computer or monitors in other bays. The monitors in the bays could also be used to allow users to interact with the game system. Interaction could include examples such as selecting a specific moving target, changing the movement speed of moving targets, controlling a specific moving target. Other means of interaction with the game systems through a monitor and computer will be apparent to those of ordinary skill in the art.

Figure 7:
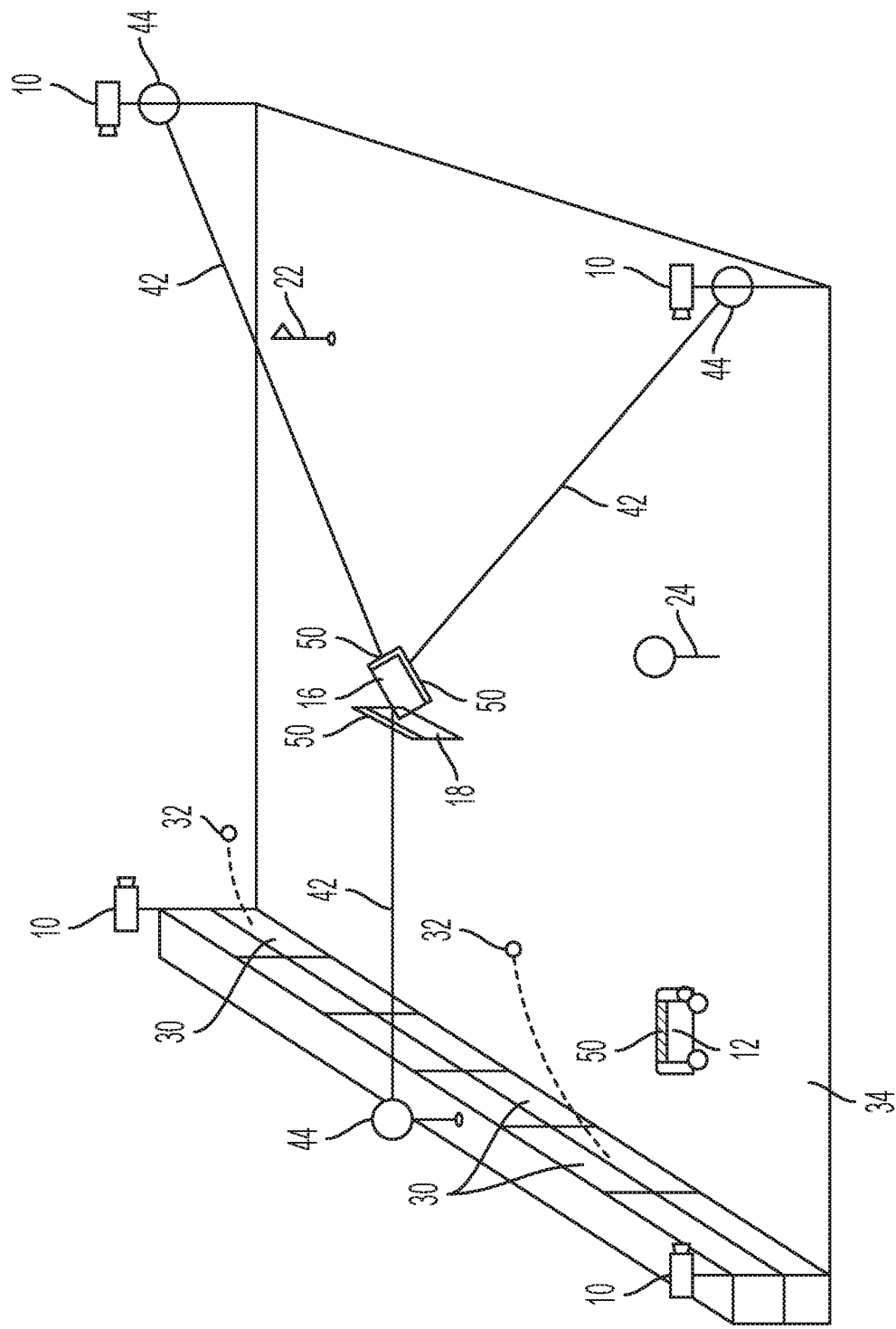
FIG. 7 is a perspective view showing another example of a field of play with a plurality of moving targets equipped with reflectors used to track the position of the moving targets, a plurality of stationary targets, and a plurality of optical sensors located on the range building and/or around the range in accordance with an illustrative embodiment of the system and process disclosed herein.

The inventive system may also include other types of moving targets 12. For instance, FIG. 7 shows a cabled object 16 that is suspended and moved using an aerial cable system. The cable system can include a series of wires or cables 42 that are mounted to motors 44, which can extend or retract the wires 42 to control the position of the cabled object 16. The moving targets 12 could also move about the field of play 34 on a track, could be shot or launched into the field of play 34, or can be any other objects which can be moved about the field of play 34 and detected by the sensors 10 and moved about the field of play 34. Moving targets 12 may also be equipped with protective elements to protect the moving target 12 from damage. For example, the cabled object 16 in FIG. 7 can include a front protective plate 18 on the cabled object 16 in order to protect the cabled object 16 from direct hits from user hit balls 32.

As used herein, the term "computer" may refer, but is not limited to a laptop or desktop computer, or a mobile device, such as a desktop, laptop, tablet, cellular phone, smart phone, personal media user (e.g., iPod), wearable computer, implantable computer, or the like. Such computing devices may operate using one or more operating systems, including, but not limited to, Windows, MacOS, Linux, Unix, iOS, Android, Chrome OS, Windows Mobile, Windows CE, Windows Phone OS, Blackberry OS, and the like.

As used herein, the term "mobile device" may refer, but is not limited to any computer, as defined herein, that is not fixed in one location. Examples of mobile devices include smart phones, personal media users, portable digital assistants, tablet computers, wearable computers, implanted computers, and laptop computers.

The system and process described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or processes described herein, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each process described above and combinations thereof may be embodied in computer executable code that, when executing on one or more computing devices, performs the steps thereof. In another aspect, the processes may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the process to be operated in a particular orientation.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for integrating physical, moving targets into a game, sport or other activity, said system comprising:
a field of play extending from a plurality of bays;
one or more moving objects launched from one or more of said bays;
one or more moving targets actively moving about said field of play during said game, sport or other activity;
a tracking system, comprising:
at least one target sensor for detecting moving target coordinate positions and reporting moving target time stamps of each of said moving targets actively moving about said field of play during said game, sport or other activity; the target sensor further configured for detecting moving object coordinate positions and reporting moving object time stamps of each of said moving objects launched from said bays; and
at least one tracking computer in electronic communication with each of said target sensors, said tracking computer configured to determine a flight path of the moving object launched from said bays using said moving object coordinate positions and said moving object time stamps, said tracking computer further configured to determine a collision of at least one of said moving objects with at least one of said moving targets.

2. The system of claim 1 wherein the target sensor is a plurality of target sensors.

3. The system of claim 2 wherein said target sensors are optical sensors, radar sensors, LIDAR sensors, or a combination thereof.

4. The system of claim 1 wherein the moving target is a plurality of moving targets.

5. The system of claim 4 wherein one or more of said moving targets comprises a highly reflective fiducial.

6. The system of claim 4 wherein the moving targets comprise flying drones, cabled objects or a combination thereof.

7. The system of claim 6 wherein movement of said moving targets is controlled by a movement computer, the tracking computer or both.

8. The system of claim 1 further comprising a stationary target positioned on said field of play, and wherein said tracking computer is configured to store a position of said stationary target on said field of play.

9. The system of claim 1 wherein the moving object is a golf ball.

10. The system of claim 1 further comprising at least one monitor in each of said bays, and said monitor configured to display the moving objects coordinate position and the moving targets moving objects.

11. The system of claim 10 wherein said monitor displays a notification upon the collision of at least one of said moving objects with at least one of said moving targets.

12. A method for integrating physical, moving targets into a game, sport or other activity using the system of claim 1.

13. A computer-implemented method for integrating physical, moving targets into a game, sport or other activity, said method comprising the steps of:
a. electronically detecting with one or more target sensors coordinate positions and time stamps of one or more moving targets actively moving about a field of play;
b. electronically detecting with the target sensors coordinate positions and time stamps of one or more moving objects launched from one or more bays;
c. electronically communicating said coordinate positions and time stamps of said moving targets and said coordinate positions and time stamps of said moving objects to a tracking computer;
d. determining a flight path of the moving object launched from said bays using said coordinate positions and time stamps of each of said moving objects; and
e. determining a collision of at least one of said moving objects with at least one of said moving targets using said coordinate positions and time stamps of each of said moving objects and said coordinate positions and time stamps of each of said moving targets; and
f. displaying said coordinate positions of said moving targets and said coordinate positions of said moving objects on at least one monitor that is in electronic communication with said tracking computer.

14. The method of claim 13 further comprising:
communicating said coordinate positions of said moving targets and said coordinate positions of said moving objects to one or more monitors located in said bays.

15. The method of claim 13 further comprising:
displaying a notification on said monitor upon said collision of one of said moving objects with one of said moving targets.

16. The method of claim 15 further comprising:
controlling movement of said moving targets with a movement computer, the tracking computer or both.

17. The method of claim 13 step a further comprising:
storing coordinate position of a stationary target on said field of play in said tracking computer.

18. The method of claim 13 wherein the target sensors are optical sensors, radar sensors, LIDAR sensors, or a combination thereof.

19. The method of claim 13 wherein one or more of said moving targets comprises a reflective fiducial.

20. The method of claim 13 wherein the moving targets comprise flying drones, cabled objects or a combination thereof.

21. A system for integrating physical, moving targets into a game, sport or other activity, said system comprising:
a field of play extending from a plurality of bays;
one or more moving objects launched from one or more of said bays;
one or more moving targets configured to actively move about said field of play during said game, sport or other activity, each of said moving targets having a moving target sensor for reporting coordinate positions of said moving target;
a tracking system, comprising:
at least one moving object sensor for detecting coordinate positions each of said moving objects launched from said bays; and
at least one tracking computer in electronic communication with each of said moving object sensors and each of said moving target sensors, said tracking computer configured to determine a flight path of the moving object launched from said bays using said moving object coordinate positions, said tracking computer further configured to determine a collision of at least one of said moving objects with at least one of said moving targets using said moving object coordinate positions and said moving target coordinate positions.

22. The system of claim 21 wherein the moving object sensor is a plurality of moving object sensors, and wherein the moving target sensor is a plurality of moving target sensors.

23. The system of claim 22 wherein said moving object sensors and said moving target sensors are optical sensors, radar sensors, LIDAR sensors, or a combination thereof.

24. The system of claim 21 wherein the moving target is a plurality of moving targets.

25. The system of claim 24 wherein one or more of said moving targets comprises a reflective fiducial.

26. The system of claim 24 wherein the moving targets comprise flying drones, cabled objects or a combination thereof.

27. The system of claim 26 wherein movement of said moving targets is controlled by a movement computer, the tracking computer or both.

28. The system of claim 21 further comprising a stationary target positioned on said field of play, and wherein said tracking computer is configured to store a position of said stationary target on said field of play.

29. The system of claim 21 wherein the moving object is a golf ball.

30. The system of claim 21 further comprising at least one monitor in each of said bays, and said monitor configured to display the moving objects coordinate position and the moving targets moving objects.

31. The system of claim 30 wherein said monitor displays a notification upon the collision of at least one of said moving objects with at least one of said moving targets.

32. A method for integrating physical, moving targets into a game, sport or other activity using the system of claim 21.

\* \* \* \* \*